June 18, 1968 YASUHARU KUBOTA ETAL 3,389,339

DISTRIBUTED PARAMETER UHF TUNER

Filed June 30, 1964 3 Sheets-Sheet 1

Inventors
Yasuharu Kubota
Koji Ouchi
Yuho Koyama by Hill, Sherman, Meroni, Gross & Simpson Attys.

Inventors
Yasuharu Kubota
Koji Ouchi
Yuho Koyama by Hill, Sherman, Meroni, Gross & Simpson Attys.

DISTRIBUTED PARAMETER UHF TUNER

Filed June 30, 1964 3 Sheets-Sheet 3

Inventors
Yasuharu Kubota
Koji Ouchi
Yuho Koyama by Hill, Sherman, Meroni, Gross & Simpson Attys.

3,389,339

DISTRIBUTED PARAMETER UHF TUNER

Yasuharu Kubota, Chiba-ken, and Koji Ouchi and Yuho Koyama, Tokyo, Japan, assignors to Sony Corporation, Tokyo, Japan, a corporation of Japan Filed June 30, 1964, Ser. No. 379,201
3 Claims. (Cl. 325—458)

ABSTRACT OF THE DISCLOSURE

A distributed parameter UHF tuner having a plurality of cavities, a first cavity responsive to a UHF and VHF input signal including means to selectively filter and separate the signal, a local oscillating circuit in another of the cavities, a resonant circuit in each of the cavities and a mixing circuit to provide an intermediate frequency output disposed in a third of the cavities.

This invention relates generally to a tuner and more particularly to an ultra-high frequency tuner having a resonant circuit of the distributed parameters type.

The present invention may be utilized in a UHF-channel receiver or an all-channel television receiver which includes reception means for very high frequency signals. Furthermore, the present invention may be employed with a UHF-VHF two-way antenna system.

One of the primary problems associated with combined UHF-VHF television signals is that of separation of one signal from the other. In a two-way antenna system, the inputs of the two-way antenna are fed to a UHF tuner or a VHF tuner through a separating means which may include, for example, a switching apparatus, a filter, or a frequency dividing apparatus.

Switching systems, however, are undesirable because the tuner device becomes complicated in structure. Such complication of the structures involves additional costs and reduces the life and reliability of the device. A primary disadvantage, however, of the switching systems for separating a UHF from VHF television signal is that the stray capacity is introduced by such apparatus. Such stray capacity is, of course, highly undesirable in a tuner and particularly in an ultra-high frequency tuner.

When receiving UHF and VHF television signals and a two-way broad band antenna capable of receiving both bands is employed, the UHF and VHF television signals therefrom may be applied to a frequency dividing apparatus for separating these two signals in each different band to be introduced to respective tuners. However, it is relatively difficult in the frequency dividing apparatus to separate the antenna signals of both UHF and VHF bands from each other without attenuation and reflection. Furthermore, a complicated frequency dividing apparatus is required for such purposes and feeding wires are also required from the frequency dividing apparatus to respective tuners, which increase the possibility of external noise being introduced and mixed therein.

From a consideration of such facts involving separation of UHF and VHF signals from broad band signals including for example UHF and VHF television signals, according to the present invention, broad band signals including signals of the two bands are introduced into a UHF tuner to be separated from each other therein, thereby eliminating the aforementioned disadvantages. Therefore, it is an object of this invention to provide a tuner having small stray capacity parameters and which is simple in structure.

A further object of this invention is to provide a tuner having extremely small energy loss and which is suitable for use with a two-way antenna system.

Still another object of the present invention is to provide a UHF tuner capable of receiving UHF and VHF television signals and separating such signals from one another.

These and other objects, features, and advantages of the present invention will be more fully realized and understood from the following detailed description when taken in conjunction with the accompanying drawings wherein.

Figures 1, 2, 7:
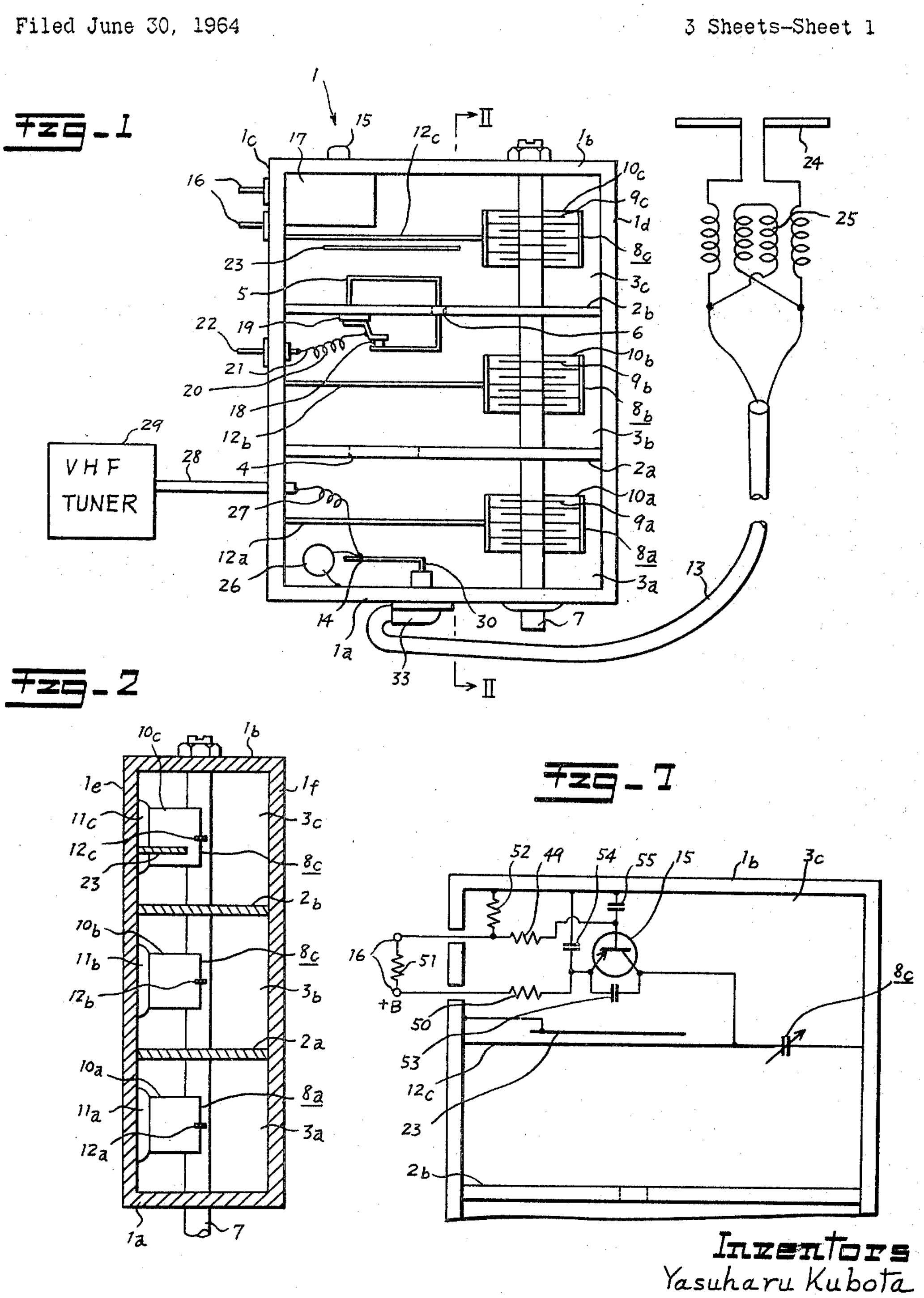
FIGURE 1 is a top plan view of the tuner device with a top cover plate removed to show the interior construction and configuration thereof.
FIGURE 2 is a sectional view taken along line II—II of FIGURE 1.
FIGURE 7 is a semi-constructional and circuit diagram of one cavity formed in the tuner casing according to the present invention.

With reference to the drawings and particularly to FIGURE 1, there is shown one preferred embodiment of the tuner of the present invention. The tuner, generally designated with the reference numeral 1, is provided with a casing consisting of a front wall 1*a*, a rear wall 1*b*, side walls 1*c* and 1*d*, a bottom wall 1*e*, and a top wall and cover plate 1*f* which are each formed of a conductive material. The case is divided by conductive partition walls 2*a* and 2*b* which are secured between the bottom, top, and side walls in substantially parallel relationship to the front wall 1*a*, forming three cavities 3*a*, 3*b*, 3*c*. A coupling window 4 is provided in the partition wall 2*a* for electromagnetic re-coupling of the cavities 3*a* and 3*b*. A loop 5 is provided for coupling the cavities 3*b* and 3*c* and extends through a hole 6 provided in partition wall 2*b*.

A rotor shaft 7 extends between the front wall 1*a* and the rear wall 1*b* and is journalled therein adjacent the right wall 1*d*. The rotor shaft extends outwardly of the front wall for allowing connection of rotating mechanisms thereto. Fixed on the shaft 7 are rotor plates 9*a*, 9*b*, and 9*c* in the respective cavities 3*a*, 3*b*, and 3*c*. Stator plates 10*a*, 10*b*, and 10*c* are fixed respectively on insulators 11*a*, 11*b*, and 11*c* mounted on the bottom wall 1*e*. Rotor plates 9*a*, 9*b*, and 9*c* and stator plates 10*a*, 10*b* and 10*c* form respective variable condensers 8*a*, 8*b*, and 8*c* in the respective cavities 3*a*, 3*b*, and 3*c*.

Mounted between the stator plates 10*a*, 10*b*, and 10*c* of the condensers 8*a*, 8*b*, and 8*c* and the left wall 1*c* substantially in the center position of each cavity are electrically and mechanically extended central conductors 12*a*, 12*b* and 12*c*. As a result, a variable resonant circuit is formed in each of the cavities. For instance, in end cavity 3*a*, central conductor 12*a*, the variable condenser 8*a*, and the distributed parameters between the central conductor 12*a* and the case 1 and/or the partition wall 2*a* form a variable resonant circuit therein. Such variable resonant circuits are also formed by the same said structure in each of cavities 3*b* and 3*c*.

A coaxial cable 13 carrying a television signal provides an input signal to a coupling loop 14 disposed in cavity 3*a*. A transistor 15 is mounted on the rear wall 1*b* for forming a local oscillator and terminals 16 are provided on the left wall 1c for supplying power thereto. An electric circuit, generally designated with the reference numeral 17, includes such circuit parameters as resistors and capacitors which are connected between the terminals 16 and the electrodes of the transistor 15. The electric circuit 17 and the transistor 15 form the local oscillator which is enclosed within the cavity 3c.

A mixer diode 18 is disposed in the cavity 3b and has one terminal thereof connected to one end of the coupling loop 5. The other terminal of the mixer diode 18 is connected to a capacitor 19 mounted on the partition wall 2b. The capacitor 19 is mounted on the partition wall 2b in such a manner that one terminal thereof is electrically connected with the partition wall 2b and the other terminal thereof is connected to the mixer diode 18 from the connection point of the diode 18 of the capacitor 19, a choke coil 20 is connected by means of a lead 21 to one end of an inner conductor 22 of a coaxial line connected into the cavity 3b through the left wall 1c.

A plate-like conductor 23 is provided in the cavity 3c substantially parallel to the central conductor 12c and is mounted on the bottom plate 1e. The conductor 23 may also be mounted on the rear wall 1b. The conductor 23 and central conductor 12c combine to form a trimmer capacitor. A silver-plated copper plate may be employed for the structure of conductor 23. The conductor 23 is disposed for being bent and varying its position with respect to the central conductor 12c. Such adjustment determines the equivalent inductance in the cavity 3c thereby varying the local oscillating frequency. As a result of such adjustment, tracking error can be adjusted.

The cable 13 which carries a UHF-VHF signal and provides such signal to cavity 3a, is connected to a broad band antenna 24 capable of receiving UHF and VHF television signals through an impedance matching transformer 25. The signal is carried by the cable 13 to the coupling loop 14 within the cavity 3a. A capacitor 26 is connected between the free end of the coupling loop 14 and the front wall 1a. The free end of the coupling loop 14 is also connected through an inductor 27 to an inner conductor of a coaxial line 28. The coaxial line 28 extends into the cavity 3a through the left wall 1c and is connected at the other end thereof to a VHF-tuner 29. In such a circuit arrangement, the reactance of the capacitor 26 is selected to be sufficiently small with respect to the UHF band and is sufficiently large with respect to the VHF band. Furthermore, reactance of the inductor 27 is selected to be sufficiently small with respect to the VHF band and substantially large with respect to the UHF band, and UHF signals are, therefore, absorbed in the network consisting of the capacitor 26 and the inductor 27, while VHF signals are permitted to pass therethrough. That is, the capacitor 26 and the inductor 27 serve as a low pass filter. In this case, the image impedance of the low pass filter consisting of the capacitor 26 and the inductor 27 is selected to match with the characteristic impedance of the VHF feeder or coaxial cable 28, e.g., 75 ohms, or the cut-off frequency of this low pass filter is selected to be an intermediate value between a maximum frequency of the VHF signal and a minimum frequency of the UHF signal, preferably a geometrical average of the two.

Figure 3:
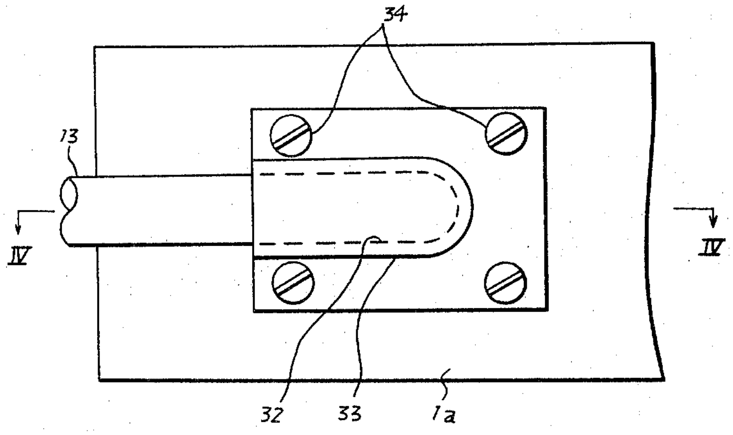
FIGURE 3 is a side view of a cover plate for connecting the antenna lead to the tuner casing.
Figure 4:
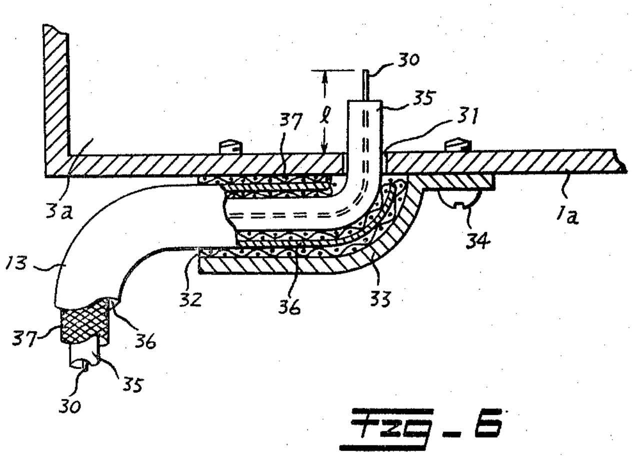
FIGURE 4 is a sectional view taken along line IV—IV of FIGURE 3.

The cable 13 is preferably coaxial and includes an inner or central conductor 30 connected to the coupling loop 14. As shown in FIGURES 3 and 4, the inner conductor 30 is extended a desired length L through a hole 31 of the front wall 1a. The cable is bent substantially at right angles such that the portion thereof outside of the cavity 3a is substantially parallel to the front wall 1a. A cover piece 33 having a U-shaped groove 32 is provided for maintaining the cable 13 in the desired configuration as shown with respect to the front wall 1a. The cover piece 33 is secured to the front wall 1a by means of bolts 34. An internal insulator 35 surrounds the inner conductor 30 and maintains an insulated spacing with the front wall 1a. An external insulator 36 provides an external covering for the cable 13 and a shield wire or a conductor 37 is disposed between the internal insulator 35 and the external insulator 36. As particularly shown in FIGURE 4 of the drawing, the shield conductor 37 adjacent the end of cable 13 extends beyond the end of the external insulator 36 and is folded over the external insulator near the hole 31. In such manner, the shield conductor 37 is interposed between the external insulator 36 and the front wall 1a and between the external insulator 36 and the cover piece 33. Thus, according to this invention the cable can be secured mechanically to the casing 1 without necessity of soldering. The contact resistance between the shield wire 37 and the case 1 is thus decreased and further there is no variation in characteristic impedance of the cable 13 at any position thereof.

Figure 5:
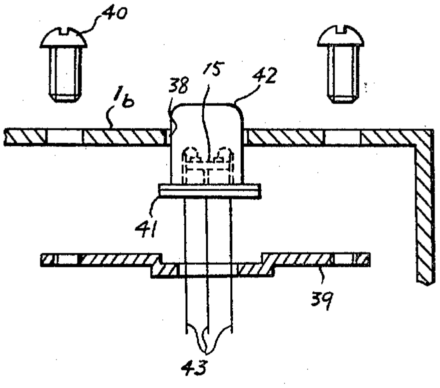
FIGURE 5 is an exploded view partially in section of the casing according to the present invention, showing a mounting arrangement of a local oscillator transistor.

As illustrated in FIGURE 5, the transistor 15 for the local oscillator is secured through a hole 38 of the rear wall 1b by means of a holder 39. A bolt 40 clamps the holder 39 to the rear wall 1b. A flange 41 is provided on a can 42 of the transistor 15 which is engaged by the holder 39 for rigidly mounting the transistor on the rear wall 1b. Lead wires 43 of the transistor 15 extend through a hole provided in holder 39. Thus, the transistor 15 is secured mechanically rigid to the case of the tuner 1 with such simple structures. In addition, heat radiation effect from the transistor 15 is favorable with such construction.

Figure 6:
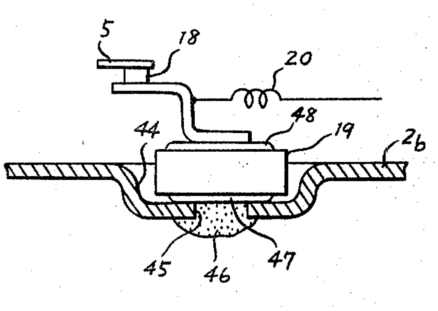
FIGURE 6 is a sectional side view illustrating a detailed construction of a partition wall of the tuner to which a capacitor is mounted.

The lead wires of the capacitor 19 must be made as short as possible so as to decrease inductance of component and stray capacity. Accordingly, in the present invention, the partition wall 2b is directly employed as one electrode of the capacitor 19. That is, a concave portion 44 is formed on the partition wall 2b as shown in FIGURE 6 and the dielectric (ceramic) capacitor 19 is deposited therein. A hole 45 in the partition wall 2b is filled with a solder 46 to connect an electrode 47 of the capacitor 19 and the grounded wall 2b. The other electrode 48 of the capacitor 19 is connected to the mixer diode 18 and the choke coil 20. With such arrangement and configuration, the inductance component and stray capacitance of the lead wires are extremely small, and further the capacitor 19 is fixed mechanically rigid to the partition wall 2b.

The local oscillator section including the transistor 15 is schematically illustrated in FIGURE 7. As shown therein, the electric circuit 17 includes bias resistors 49, 50, 51, and 52 and by-pass capacitors 53, 54, and 55.

Figure 8:
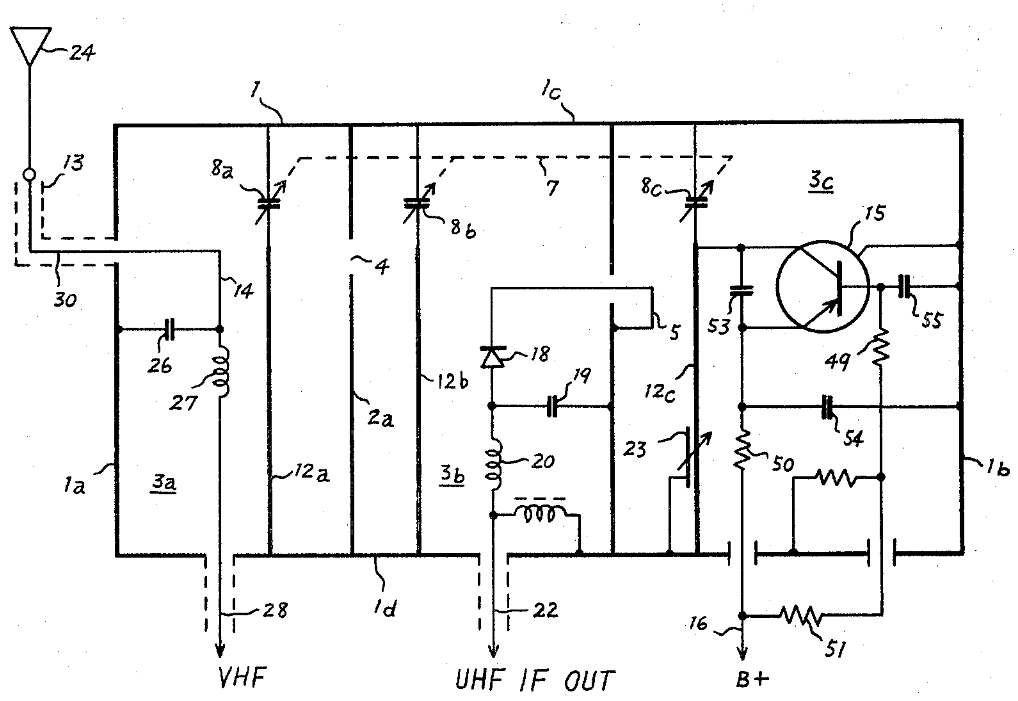
FIGURE 8 is a schematic diagram illustrating the principal components and parameters of the present invention.

FIGURE 8 illustrates the entire schematic diagram of the present invention, and as shown therein, the antenna 24 is connected directly to coaxial cable 13. Such direct connection of the antenna may be made as shown in FIGURE 8, or the impedance matching transformer 25 may be employed. According to the present invention, the free end of the coupling loop 14 connected to the inner conductor 30 of the coaxial feeder 13 is connected through the capacitor 26 without connecting directly to the front wall 1a. As described in the foregoing, VHF and UHF television signals received by the antenna 24 are supplied to the UHF tuner 1 through the feeder cable 13. Accordingly, during reception of the UHF television signals, the signals are pre-selected in the cavity 3a through the loop 14 and the pre-selected signals are absorbed in a cavity 3b through the coupling window 4. The signals are mixed in the diode 18 together with local oscillating frequency signals derived from the coupling loop 5 of the cavity 3c and are converted to intermediate frequency signals. On the other hand, during reception of the VHF television signals, the signals pass through a low pass filter consisting of the capacitor 26 and the inductor 27 without being attenuated and are derived at the feeder cable 28 connected to the left wall 1c.

According to this invention, a UHF tuner having a low pass filter connected to the input loop 14 of the tuner functions as a usual UHF-tuner during reception of the UHF television signals. During reception of the VHF television signals, the VHF signals can be separated from the UHF-VHF input signals through the cavity *3a* without loss of the signals.

For purposes of example, the following tabulation of the values of various components utilized in an actual embodiment of the invention is supplied, but it is to be understood that these may be varied without departing from the scope of the present invention:

| | | |
|---|---|---|
| Resistors: | | |
| **49** | ohms | 500 |
| **50** | kilo-ohms | 1 |
| **51** | do | 2.2 |
| **52** | do | 6.8 |
| Capacitors: | | |
| *8a*, *8b*, *8c* | | (1) |
| **19** | picofarads | 15 |
| **26** | do | 12 |
| **53** | do | 0.5 |
| **54** | do | 2 |
| **55** | do | 1000 |

[1] Gang variable capacitor max. 15 picofarads.

(1 picofarad=1 micromicrofarad)

| | | |
|---|---|---|
| Inductors: | | |
| **20** | millimicrohenries | 100 |
| **27** | do | 37 |
| Transistors: | | |
| 2SA280 (mesa-type) | | |
| Diode: | | |
| 1T13 (Backward diode) | | |
| +B: | | |
| 12 volts D.C. | | |
| Receiving bands: | | |
| VHF (ch. 2–ch. 13) | | |
| UHF (ch. 14–ch. 83) | | |

It will be apparent that many modifications and variations may be effected without departing from the scope of the novel concept of this invention.

We claim as our invention:

1. A tuner comprising (a) a plurality of cavities having conductive partition walls therebetween, (b) frequency selection means disposed in each of said cavities, (c) local oscillating means disposed in one of said cavities, (d) combined UHF and VHF signal input means disposed in a second one of said cavities, said signal input means including means to selectively filter said UHF signals and to pass the VHF signal to a VHF tuner, (e) means coupling the UHF signal of said one cavity to a third one of said cavities, (f) one of said partition walls between said second and said third cavities having a coupling window therein, and (g) means for mixing the UHF output of said coupling means and another output from said coupling window.

2. The tuner of claim 1 wherein said coupling means includes a loop extending between said one cavity and said third cavity.

3. A tuner comprising (a) conductive bottom, top, end, and side walls, (b) conductive partition walls secured between said bottom wall, said top wall, and said side walls and defining a plurality of cavities, (c) variable capacitance means disposed in each of said cavities, (d) a plurality of conductors each connected between said variable capacitance means and one of said side walls of a respective cavity, (e) local transistor oscillating means disposed in one of said cavities and coupled to a respective one of said conductors, said transistor means having power supply terminal means mounted on and isolated from one of said walls, (f) combined UHF and VHF signal input means disposed in a second one of said cavities, said signal input means including means to selectively filter said UHF signals and to pass the VHF signal to a VHF tuner, (g) means coupling said one cavity and said second cavity to a third one of said cavities, (h) means disposed in said third cavity for mixing outputs of said coupling means, (i) a coaxial cable having an inner conductor, a shielding conductor, and insulation separating said inner conductor from said shielding conductor, said inner conductor extending into said second cavity, said shielding conductor disposed adjacent the end wall of said second cavity, and (j) a cover plate receiving said coaxial cable secured to the end wall of said second cavity and having a curved portion therein for holding said inner conductor at substantially right angles to the end wall and holding said shielding conductor in electrical connection with the end wall.

References Cited

UNITED STATES PATENTS

| | | | |
|---|---|---|---|
| 2,995,655 | 8/1961 | Meadows et al. | 325—459 X |
| 3,242,432 | 3/1966 | Eland | 325—453 |

KATHLEEN H. CLAFFY, *Primary Examiner.*

R. LINN, *Assistant Examiner.*